(12) United States Patent
Blixt et al.

(10) Patent No.: US 10,198,496 B2
(45) Date of Patent: Feb. 5, 2019

(54) SYSTEM, METHOD AND COMPUTER PROGRAM PRODUCT FOR APPLYING A PUBLIC TAG TO INFORMATION

(71) Applicant: salesforce.com, inc, San Francisco, CA (US)

(72) Inventors: Emily Alane Blixt, San Mateo, CA (US); Andrey D. Gusev, San Francisco, CA (US); Susan Marie Kimberlin, San Francisco, CA (US); Jeffrey M. Bergan, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 154 days.

(21) Appl. No.: 13/849,434

(22) Filed: Mar. 22, 2013

(65) Prior Publication Data

US 2013/0218874 A1    Aug. 22, 2013

Related U.S. Application Data

(63) Continuation of application No. 12/465,478, filed on May 13, 2009, now Pat. No. 9,251,239.

(60) Provisional application No. 61/053,302, filed on May 15, 2008.

(51) Int. Cl.
*G06F 17/30* (2006.01)

(52) U.S. Cl.
CPC .. *G06F 17/30595* (2013.01); *G06F 17/30525* (2013.01); *G06F 17/30554* (2013.01)

(58) Field of Classification Search
CPC . G06F 17/30; G06F 17/3089; G06F 17/30371
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,212,518 B1 * | 4/2001 | Yoshida ............ G06F 17/30545 |
| 6,216,135 B1 | 4/2001 | Brodersen et al. |

(Continued)

*Primary Examiner* — Rehana Perveen
*Assistant Examiner* — Huen Wong
(74) *Attorney, Agent, or Firm* — Meyertons, Hood, Kivlin, Kowert & Goetzel, P.C.

(57) ABSTRACT

In accordance with embodiments, there are provided mechanisms and methods for applying a public tag to information. These mechanisms and methods for applying a public tag to information may enable embodiments to allow a user to apply a public tag to the information once. Further, applying a public tag to information may enable users with access to the information an ability to view the public tag applied to the information by the user.

16 Claims, 5 Drawing Sheets

(56) References Cited

U.S. PATENT DOCUMENTS

| | | |
|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,185,001 B1 * | 2/2007 | Burdick .............. G06F 17/3064 |
| 7,197,508 B1 * | 3/2007 | Brown, III .................... 707/721 |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,039 B2 | 8/2010 | Weissman et al. |
| 7,792,795 B1 * | 9/2010 | Swartz et al. ................. 707/627 |
| 8,015,495 B2 | 9/2011 | Achacoso et al. |
| 8,036,937 B2 * | 10/2011 | Tang ................. G06F 17/30864 |
| | | 705/14.4 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 8,856,643 B2 * | 10/2014 | Drieschner ....... G06F 17/30887 |
| | | 715/234 |
| 9,330,071 B1 * | 5/2016 | Ahmed .................. G06F 17/211 |
| 2001/0044791 A1 | 11/2001 | Richter et al. |
| 2002/0019827 A1 * | 2/2002 | Shiman et al. ............... 707/203 |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0103813 A1 * | 8/2002 | Frigon .............. G06F 17/30247 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004861 A1 * | 1/2003 | Amend et al. .................. 705/37 |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0023868 A1 * | 1/2003 | Parent .......................... 713/200 |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0212718 A1 * | 11/2003 | Tester ................. G06F 21/6227 |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0030686 A1 * | 2/2004 | Cardno et al. ..................... 707/3 |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 * | 3/2005 | Weissman et al. ............... 707/4 |
| 2005/0091098 A1 | 4/2005 | Brodersen et al. |
| 2005/0223022 A1 * | 10/2005 | Weissman et al. ........... 707/102 |
| 2006/0021019 A1 | 1/2006 | Hinton et al. |
| 2006/0080305 A1 * | 4/2006 | Dill et al. ........................ 707/3 |
| 2007/0124276 A1 * | 5/2007 | Weissman et al. ............... 707/2 |
| 2007/0156650 A1 * | 7/2007 | Becker ................ G06F 17/3089 |
| 2007/0271498 A1 * | 11/2007 | Schachter ......... G06F 17/30884 |
| | | 715/205 |
| 2008/0082540 A1 * | 4/2008 | Weissman et al. ............... 707/9 |
| 2008/0091723 A1 * | 4/2008 | Zuckerberg ....... G06F 17/30265 |
| 2008/0222513 A1 * | 9/2008 | Van Den Berge ......................... |
| | | H04N 1/00209 |
| | | 715/234 |
| 2008/0249972 A1 | 10/2008 | Dillon |
| 2008/0281610 A1 * | 11/2008 | Yoshida ................. G06Q 30/02 |
| | | 705/1.1 |
| 2008/0288453 A1 * | 11/2008 | Smetters et al. ................... 707/3 |
| 2009/0013011 A1 * | 1/2009 | Barker et al. ................. 707/203 |
| 2009/0063415 A1 | 3/2009 | Chatfield et al. |
| 2009/0094189 A1 * | 4/2009 | Stephens ........... G06F 17/30864 |
| 2009/0100342 A1 | 4/2009 | Jakobson |
| 2009/0164915 A1 * | 6/2009 | Gasn ................ G06F 17/30997 |
| | | 715/753 |
| 2009/0177744 A1 | 7/2009 | Marlow et al. |

(56) References Cited

U.S. PATENT DOCUMENTS

| | | | |
|---|---|---|---|
| 2009/0324022 A1* | 12/2009 | Sangberg | G06F 17/30265 382/118 |
| 2010/0228730 A1* | 9/2010 | Muller | G06F 17/30011 707/736 |
| 2011/0182485 A1* | 7/2011 | Shochat | G06K 9/00221 382/118 |
| 2011/0202531 A1* | 8/2011 | Zuckerberg | G06F 17/30265 707/737 |
| 2011/0218958 A1 | 9/2011 | Warshavsky et al. | |
| 2011/0247051 A1 | 10/2011 | Bulumulla et al. | |
| 2012/0042218 A1 | 2/2012 | Cinarkaya et al. | |
| 2012/0271941 A1* | 10/2012 | Mirandette | H04L 67/22 709/224 |
| 2013/0212115 A1* | 8/2013 | Yerli | G06F 17/30268 707/749 |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2014/0044358 A1* | 2/2014 | Srinivasan | G06Q 50/01 382/190 |
| 2014/0208414 A1* | 7/2014 | Brandwine | G06F 21/6218 726/17 |
| 2014/0359537 A1 | 12/2014 | Jackobson et al. | |
| 2015/0006289 A1 | 1/2015 | Jakobson et al. | |
| 2015/0007050 A1 | 1/2015 | Jakobson et al. | |
| 2015/0095162 A1 | 4/2015 | Jakobson et al. | |
| 2015/0142596 A1 | 5/2015 | Jakobson et al. | |
| 2015/0172563 A1 | 6/2015 | Jakobson et al. | |

\* cited by examiner

SYSTEM, METHOD AND COMPUTER PROGRAM PRODUCT FOR APPLYING A PUBLIC TAG TO INFORMATION

CLAIM OF PRIORITY

This application is a continuation of U.S. application Ser. No. 12/465,478, filed May 13, 2009, which claims the benefit of U.S. Provisional Patent Application No. 61/053,302, filed May 15, 2008, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to tagging information, and more particularly to tagging records in an improved manner.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, a database may include multiple data resources and users of the conventional database systems may be able to view the data resources. In addition, the users may label (e.g. tag) each data resource in order to further categorize the data resource. The label for each data resource may include information obtained from the user describing the data resource. Unfortunately, multiple users may each label the data resource using different information (e.g. depending upon the user's labeling style, spelling, shorthand, etc.).

For example, a first user may label a particular data resource using a full name of a geographic region associated with the particular data resource, while another user may label the particular data resource using a shorthand name of a geographic region associated with the particular data resource. Therefore, the inconsistent labeling of the data resources by the users of the aforementioned database systems may lead to various shortcomings in data resource labeling, etc.

BRIEF SUMMARY

In accordance with embodiments, there are provided mechanisms and methods for applying a public tag to information. These mechanisms and methods for applying a public tag to information may enable embodiments to allow a user to apply a public tag to the information once. Further, applying a public tag to information may enable users with access to the information an ability to view the public tag applied to the information by the user.

In an embodiment and by way of example, a method is provided for applying a public tag to information. In use, a public tag is received from a tenant. Further, the public tag is applied to information stored in a portion of a database such that the public tag is only applied to the information once. Additionally, a capability to view the public tag is provided to users associated with the tenant.

While the present invention is described with reference to an embodiment in which techniques for applying a public tag to information for tenants of an on-demand database service are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification my also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

General Overview

Systems and methods are provided for applying a public tag to information.

To date, users of a database may individually label a data resource of the database in order to further categorize the data resource. Unfortunately, inconsistent individual labeling of the data resource by the users of the database may lead to various shortcomings in data resource labeling for a group of users.

Thus, mechanisms and methods are provided for applying a public tag to information once to enable a group of users with access to the information an ability to view the public tag. The ability of embodiments to provide the ability to apply the public tag may allow the group of users to utilize the public tag for viewing, searching, reporting, etc.

Next, mechanisms and methods for applying a public tag to information will be described with reference to exemplary embodiments.

Figure 1:
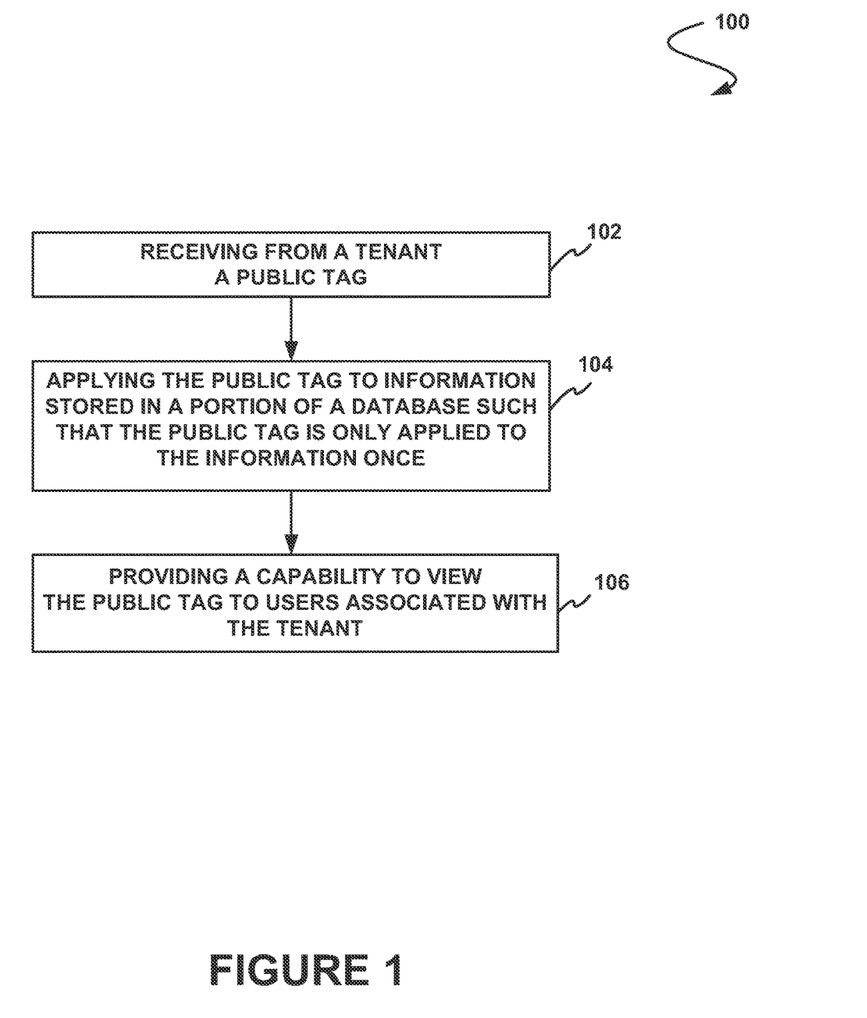
FIG. 1 shows a method for applying a public tag to information, in accordance with one embodiment.

FIG. 1 shows a method 100 for applying a public tag to information, in accordance with one embodiment. As shown, a public tag is received from a tenant. See operation 102. In one embodiment, the public tag may include any tag associated with information. As an option, the information may include at least one object, record, etc. For example, the public tag may be associated with multiple records. As another option, the public tag may be associated with the information on an ad hoc basis. As an option, the public tag may be associated with the tenant.

Further, as yet another option, the public tag may include a tag name. Optionally, the tag name may be associated with the information. As still yet another option, the public tag may include a normalized public tag (e.g. a normalized form of the public tag). For example, normalizing the public tag may include arranging, adjusting, organizing, renaming, standardizing, etc. As another option, the public tag may include the tag name and a normalized tag name. For example, the tag name may be "san_francisco" and the normalized tag name may be "San Francisco." In addition, as yet another option, the public tag received from the tenant may be normalized (e.g. after the public tag is received the public tag may be normalized).

Additionally, the public tag is applied to information stored in a portion of a database, such that the public tag is only applied to the information once, as shown in operation 104. As an option, the information may include a subset of records stored in the portion of the database. In another embodiment, the portion of the database may be managed for the tenant and other tenants by an on demand service. In one embodiment, the tenant may include a lessee, a renter, a group of users, a company, an entity, etc. that may utilize the on demand service. For example, multiple different tenants may utilize the on demand service. Optionally, applying the public tag to the information may include associating the public tag with the information, linking the public tag with the information, referencing the public tag with the information, etc. As yet another option, applying the public tag to the information once may include associating the public tag to the information with the tenant such that only one instance of the public tag can be applied to the same information for each tenant. As an option, the public tag may be applied to the information once for each group, division, organization, tenant, etc. For example, the division may include a subset of the organization (e.g. west, east, etc.).

In addition, a capability to view the public tag is provided to users associated with the tenant. See operation 106. As an option, the capability to view the public tag may be conditionally provided based on at least one permission. Optionally, the permission may be associated with the tenant. Still yet, as another option, the permission may be associated with a user, at least a portion of the users, a subset of users, groups of users, divisions, organizations, etc. associated with the tenant. In an embodiment, viewing the public tag may include displaying, retrieving, searching, viewing, etc. records associated with the public tag. For example, the tenant may select the public tag in order to view records associated with the public tag.

In one embodiment, the permissions may be utilized to conditionally provide an ability to modify the public tag, delete the public tag, remove the public tag, view the public tag, browse all public tags, etc. Optionally, a user may add, create, assign, etc. a public tag to a record to which the user has at least a read-access permission. As an option, the permissions may include a tag manager permission. For example, the tag manager permission may allow a user (e.g. an organizer, an administrator, etc.) to control how other users interact with the public tags. As another option, an administer may view, edit, merge, create, add, or remove all tags (e.g. private tags, public tags, etc.).

As another option, the permissions may include a tag create permission. As an example, the tag create permission may allow the user to create the public tag. Further, as yet another option, the permissions may include a tag edit permission that may allow the user to edit a name of a public tag, merge two public tags, delete a public tag, etc. For example, given two public tags, tag A and tag B, if the user edits a name of tag B to be the same as a name of tag A, then tag B may be merged into tag A (e.g. all records associated with tag B may now be associated with tag A). Additionally, as still yet another option, the permissions may include a tag add permission that may allow the user to add a public tag to a record. In addition, as an option, the permissions may include a tag delete permission that may allow the user to remove a public tag from a record. As an example, a user without the tag add permission and the tag remove permission may be able to view and use the public tags without altering the public tags. Optionally, permissions may be utilized for a single user, a subset of users, groups of users, divisions, organizations, etc.

In another embodiment, the public tag may be deleted. As an option, deleting the public tag may include hard deleting the public tag (e.g. removing the public tag). As another option, deleting the public tag may include soft deleting the public tag (e.g. moving the public tag to a recycle bin). Optionally, the public tag may be restored after being soft deleted. Further, as yet another option, restoring the public tag may restore any associations with the information and the public tag. For example, if a public tag was soft deleted and sent to the recycle bin, then the user may restore the public tag and any associations with the information. Additionally, as still yet another option, if the tenant removes the public tag from a record, then the public tag may be soft deleted if it was the only instance of that public tag. Optionally, if the tenant removes the public tag from the record and it was not the only instance of that public tag, then the association between the public tag and the record may be removed. As another option, if the tenant removes the public tag from a record and then soft deletes the record, then the tag associated with that record may not be restored if the user restores the soft deleted record. Further, as yet another option, a soft deleted public tag may be hard deleted after a predetermined time period. For example, the predetermined time period may be configured for each user, subset of users, division, organization, tenant, etc. Optionally, the soft deleted public tag may be capable of being restored before the predetermined time period. As yet another option, public tags without any associated records (e.g. unused public tags) may be detected and may further be soft deleted, hard deleted, cleaned, removed, etc. In addition, as an option, records associated with the soft deleted tags may not be returned in results from tag selections.

In still yet another embodiment, the public tags may be searchable. As an option, the public tags may be searchable using search syntax including logic operators (e.g. Boolean operators), wildcards, exact phrases, etc. Furthermore, as yet another option, a sidebar search, an advanced search, a tag home search, a tag search, or any other search capable of providing a search feature may be utilized. Optionally, the searches may use a display name, a normalized name, or any other name associated with the public tags. As another option, a plurality of public tags may be searched for at least one search term to locate a subset of the information associated with at least one matching public tag based on a tag name or a normalized public tag. Further, as yet another option, the searching may include normalizing at least one search term prior to performing the search. As still yet another option, a user may subscribe to the results of the search, and may also subscribe to the tags. For example, a user may subscribe to a tag and receive alerts when records are associated with that tag.

In one embodiment, the public tags may be limited to a number of the public tags. As an option, the number of public tags that are applied to the information for the tenant may be limited. Furthermore, as yet another option, the number of the public tags may be separately limited for each tenant. Optionally, limits for the number of tags (e.g. public tags and/or private tags) may be predetermined. As yet another option, limits for a number of applications of each tag (e.g. a join between a tag and a record) may be predetermined. For example, the limits may include 500 tags per each standard user, 100 tags per each portal user, 1,000 tags per each organization, etc. As another example, the limits may include 50,000 applications of each tag for an organization, 5,000 applications of each tag for each standard user, 1,000 applications of each tag for each portal user, etc. As yet another example, the limits may include a total of 5,000,000 applications for all of the tags for an organization, 50,000 applications for all of the public tags for an organization, etc. Optionally, the limits may be predetermined, provisioned, configured, etc. for each user, subset of users, division, organization, tenant, etc. As another option, the administrator may merge tags to mitigate the number of tags and the number of tag applications towards the defined limits.

In another embodiment, soft deleting a tag may remove the tag from the limit counts. Optionally, soft deleting the tag may remove it from the number of tag limits and the number of applications of each tag limits. For example, if a user deletes a record that is tagged, each instance of a tag associated with that record may be decremented from the overall count of each tag. As another example, if a user restores a record, the associated tags may be restored, thereby impacting an overall total number of the tags. Optionally, two soft deletes may be equivalent to one hard delete.

In one embodiment, the information may be tagged with public tags and/or private tags. Further, as yet another option, once the public tag is applied to the record, other users with read access to the record may view the public tag. For example, if a first user applies a public tag to a record, then all the other users with read access to the record may view the applied public tag for the record. Optionally, the public tag may be viewed in a tag browser. Furthermore, as still yet another option, a number of records associated with a tag may indicate the tag's usage number. As an example, the tag's usage number may grow as additional records are associated with the tag.

In another embodiment, private tagging and public tagging may be utilized at the same time. For example, private tagging may include tagging of records that are only available to the user that applied the tags to the records. As an option, private tagging may allow the user to apply their own instance of a tag to the record, where the record may be associated with a public tag, another user's private tag, etc. Optionally, a tag may be a private tag if the owner of the tag is a user. As another option, the tag may be a public tag if the owner of the tag is a group, division, organization, tenant, etc.

In yet another embodiment, a tag home may be utilized to view all public tags associated with the records. Furthermore, as an option, the tag home may allow the user to search and browse the available public tags and/or private tags. Additionally, as another option, the tag home may indicate a number of records associated with each tag.

In still yet another embodiment, a tag Application Programming Interface (API) may allow users to access and/or query tag data. As an option, any function that is performable utilizing a user interface may be performable utilizing the tag API. As an example, the tag API may include functions to set sharing for a tag during creation for public tags and/or private tags, query sharing on an existing tag, edit sharing on an existing tag, assign tags to records, query which tags exist, query tag join tables to determine which records are associated with a tag, mass add tags, mass remove tags, mass apply a tag to the records, mass remove a tag from the records, etc.

Additionally, in one embodiment, the tags may be utilized in association with mini page layouts, printable views, products, users, list views, report filters, workflow rule criterion, offline editions, etc. As an option, the tags may be added and/or removed from workflow rule actions. Further, as another option, the tags may be shown in results (e.g. results of a sidebar, a search, etc.). Still, as yet another option, the tags may be utilized as additional facets for search results. Optionally, private tags may be converted to public tags. In addition, as another option, the tags may be shared (e.g. manually, application-context, etc.).

Furthermore, as an option, the tags may be suggested while the user types. For example, after the user enters a letter, a list of suggested matching tags may be suggested. As another option, tags may be constrained in a workplace (e.g. confined, restricted, etc.). Additionally, as yet another option, the tags may be managed as entities. As an example, managing the tags as entities may include allowing synonyms, renaming, bulk deletions, localizations, etc. As still yet another option, document attributes may be utilized as tags associated with a document (e.g. if the document is classified, then the document may be tagged in association with the classification). Optionally, documents may be automatically tagged when uploaded utilizing a term extraction library. In addition, as another option, a tag group may include a set of tags that may be utilized and managed by a defined set of users for a defined set of records.

In another embodiment, the public tags, features, and functionality associated with the public tags may be utilized under various models. Optionally, a tag definition may include a tag name and an associated record, a tag administrator may include a user that has permissions for managing public tags, creating a tag may include establishing a new tag definition, editing a tag may include changing text of a tag name and/or merging tags, deleting a tag may include sending a tag definition to a recycle bin and/or removing the tag definition from all associated records, adding a tag may include associating a tag definition with a record, and removing a tag may include removing an association between a tag definition and a record. As an option, based on an edition, the features and functionality may be included in the edition or may be provided in the edition at an additional cost.

In yet another embodiment, an open model may allow all end users to create public tags, edit public tag definitions, delete public tag definitions, add public tags to any record they have read-access to, remove a public tag assigned to a record they have read-access to, view tags on records they have read access to, and browse all public tags.

In still yet another embodiment, a limited managed model may allow all end users to create public tags, only tag administrators to edit public tag definitions, only tag administrators to delete public tag definitions, all end users to add public tags to any record they have read-access to, a record owner to remove a public tag from a record, a user that assigned a public tag to a record to remove that tag from a record, all end users to view tags on records they have read access to, and all end users to browse all public tags.

In one embodiment, a managed model may allow only tag administrators to create public tag definitions, only tag administrators to edit public tag definitions, only tag administrators to delete public tag definitions, only the record owner to add public tags to a record, only the record owner to remove a public tag from a record, all end users to view public tags on records they have read access to, and all end users to browse all public tags.

In another embodiment, a portal (e.g. partner portal) may be utilized. As an option, the limits for tag names and tag applications may be lower than a non-portal (e.g. standard application) limit. For example, the portal may have more users, thus lower tag limits may be utilized to help prevent over utilization. Additionally, as another option, viewing public tags by portal users may be limited to the public tags created by portal users and/or the public tags created for the portal by non-portal users. As an example, the portal users may not be able to view all of the public tags for the organization that the portal resides in. Optionally, the public tags for an organization may not be visible via the portal (e.g. visibility is separated between the portal and the organizations). Furthermore, as an option, the public tag may be marked as public and/or published in order to be viewable via the portal.

In yet another embodiment, tags may be utilized as a filter criteria for workflow rules. Optionally, an action of the workflow rules may include add tag and/or remove tag. Furthermore, as another option, a tag may be added as an outcome of a workflow rule.

In still yet another embodiment, converting leads may include several options pertaining to tags. As an option, if tags are not enabled on accounts, then the tags may be no longer accessible upon lead converting. For example, if the tags are not enabled, then counts may be decremented and the account records may not be returned in the tag browser on tag selection. As another option, if tags are enabled on both leads and accounts, then the tags may be transferred and may still be visible and editable. Further, as yet another option, if the user can no longer view the record, then the tags may be no longer be accessible. Additionally, as an option, the tags may not be removed from a converted lead. For example, if the user has access to the converted lead record and the account, then the user may be able to view their private tags (e.g. personal tags) on both and tag usage counts may further reflect the private tags.

Furthermore, in one embodiment, a user may perform a mass action. As an option, a mass delete records action may be added to allow administrators with permissions to modify all records an option to delete tags, and an option to manage a number of tags and usages against organization limits. Optionally, the number of usages for each tag may be available for filtering the displayed list when selecting which tags to delete. As another option, the user may mass tag, mass delete, and/or mass add records associated with a tag. Further, as yet another option, the user may add and/or remove a tag from multiple records.

Additionally, in another embodiment, for sandbox and organization migration, tags may include setup metadata. As an option, the tag enablement and inclusion in page layouts may be included in a setup-only copy of an organization for a sandbox. As another option, all tag data may be included in a full copy of an organization for a sandbox.

In yet another embodiment, page layouts may utilize a header section for the tags. As an option, the page layouts may be based on private tag layouts. Optionally, a unique header may be created for detail pages, tag add pages, and/or tag remove pages.

Figure 2:
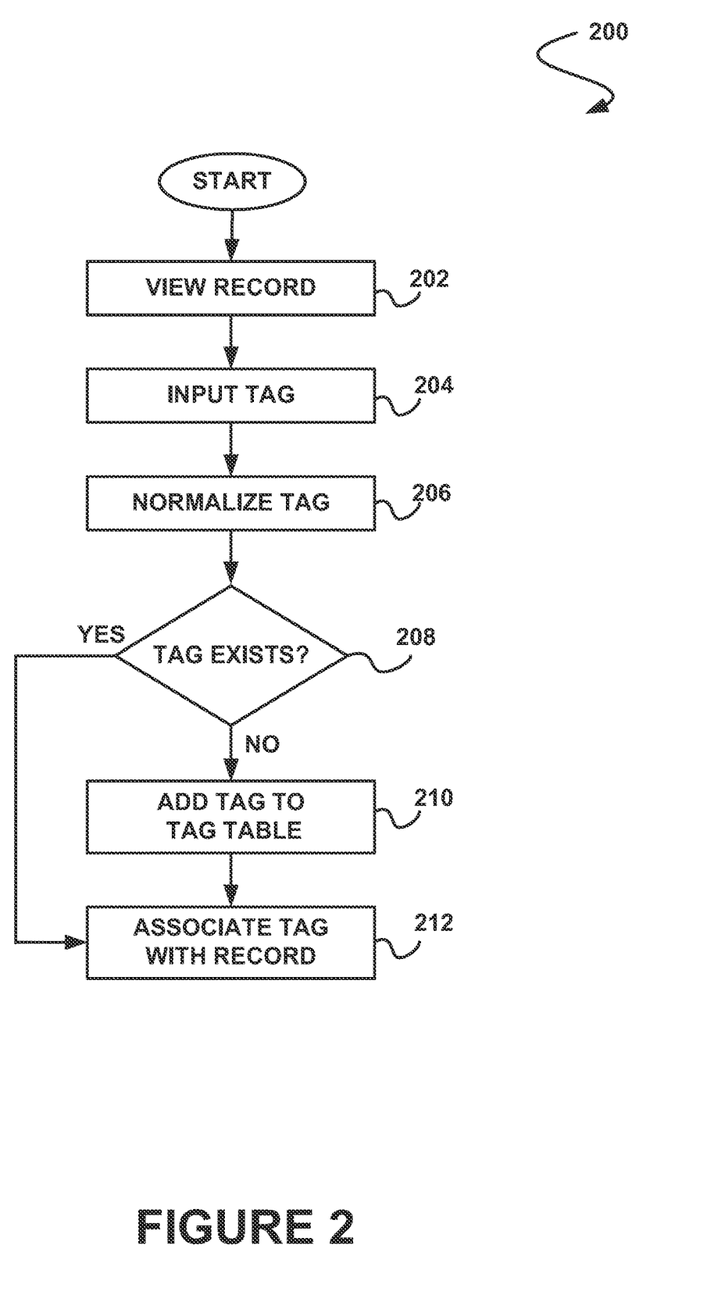
FIG. 2 shows a method for applying a public tag to information, in accordance with another embodiment.

FIG. 2 shows a method for applying a public tag to information, in accordance with another embodiment. As an option, the present method 200 may be carried out in the context of the functionality of FIG. 1. Of course, however, the method 200 may be carried out in any desired environment. The aforementioned definitions may apply during the present description.

As shown, a record is viewed. See operation 202. As an option, the record may be viewed utilizing a user interface. For example, a user may view the record utilizing the user interface. Optionally, the user interface may include a tag browser, a network browser, or any other interface capable of viewing the record.

Further, as shown in operation 204, a tag is input. As an option, the user may input the tag. As an example, the user may input the tag utilizing a field of the user interface. Additionally, the tag is normalized. See operation 206. Optionally, the tag may be normalized after the user has input the tag.

Additionally, as shown in determination 208, it is determined if the tag exists. As another example, a database may be queried to determine if the normalized tag is associated with the viewed record. As shown in operation 210, if the tag does not exist, then the tag is added to the tag table. For example, if the tag does not exist, then the normalized tag may be added to the tag table. Further, as another option, the tag may be added to the tag table and associated with a group of the user.

Furthermore, the tag is associated with the record. See operation 212. Optionally, associating the tag with the record may include associating the record with an identifier (ID) of a record of the tag in the tag table. As yet another option, associating the tag with the record may include associating the record with an ID of a record of an intermediate table, and further associating the record of the intermediate table with an ID of the record of the tag in the tag table.

Figure 3:
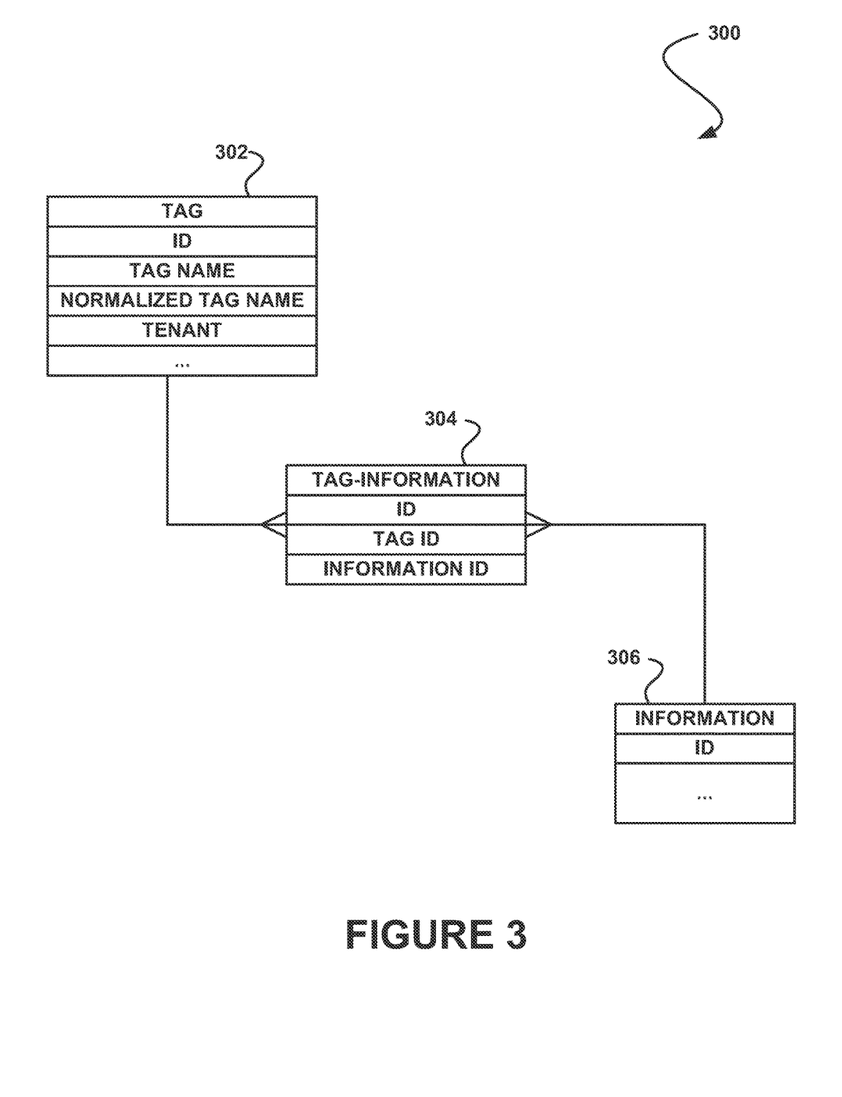
FIG. 3 illustrates a data structure for applying a public tag to information, in accordance with yet another embodiment.

FIG. 3 illustrates a data structure for applying a public tag to information, in accordance with yet another embodiment. As an option, the data structure 300 may be implemented in the context of the functionality of FIGS. 1-2. Of course, however, the data structure 300 may be implemented in any desired environment. Again, the aforementioned definitions may apply during the present description.

As shown, the data structure 300 includes a tag table 302. In one embodiment, the tag table 302 may include an ID field. As an option, the ID field may be utilized as a key to the tag table 302. Further, as another option, the tag table 302 may include a tag name field. Additionally, as yet another option, the tag table 302 may include a normalized tag name field. Furthermore, as an option, the tag table 302 may include at least one additional field associated with a tag (e.g. tenant, etc.).

In addition, as shown, the data structure 300 includes an information table 306. In yet another embodiment, the information table 306 may include an ID field. As an option, the ID field may be utilized as a key to the information table 306. Furthermore, as an option, the information table 306 may include at least one additional field associated with information.

Additionally, as shown, the data structure 300 includes a tag-information table 304. In another embodiment, the tag-information table 304 may include an ID field. As an option, the ID field may be utilized as a key to the tag-information table 304. Further, as another option, the tag-information table 304 may include a tag ID field. As an example, the tag ID field may be associated with the ID field of a record of the tag table 302. Additionally, as yet another option, the tag-information table 304 may include an information ID field. As an example, the information ID field may be associated with the ID field of a record of the information table 306.

In still yet another embodiment, each record of the tag table 302 may be associated with at least one record from the information table 306 via the association with the tag-information table 304. For example, a record of the tag table 302 may be associated with at least one record of the tag-information table 304, each of which may be associated with a record of the information table 306.

Further, in one embodiment, each record of the information table 306 may be associated with at least one record from the tag table 302 via the association with the tag-information table 304. As another example, a record of the information table 306 may be associated with at least one record of the tag-information table 304, each of which may be associated with a record of the tag table 302.

System Overview

Figure 4:
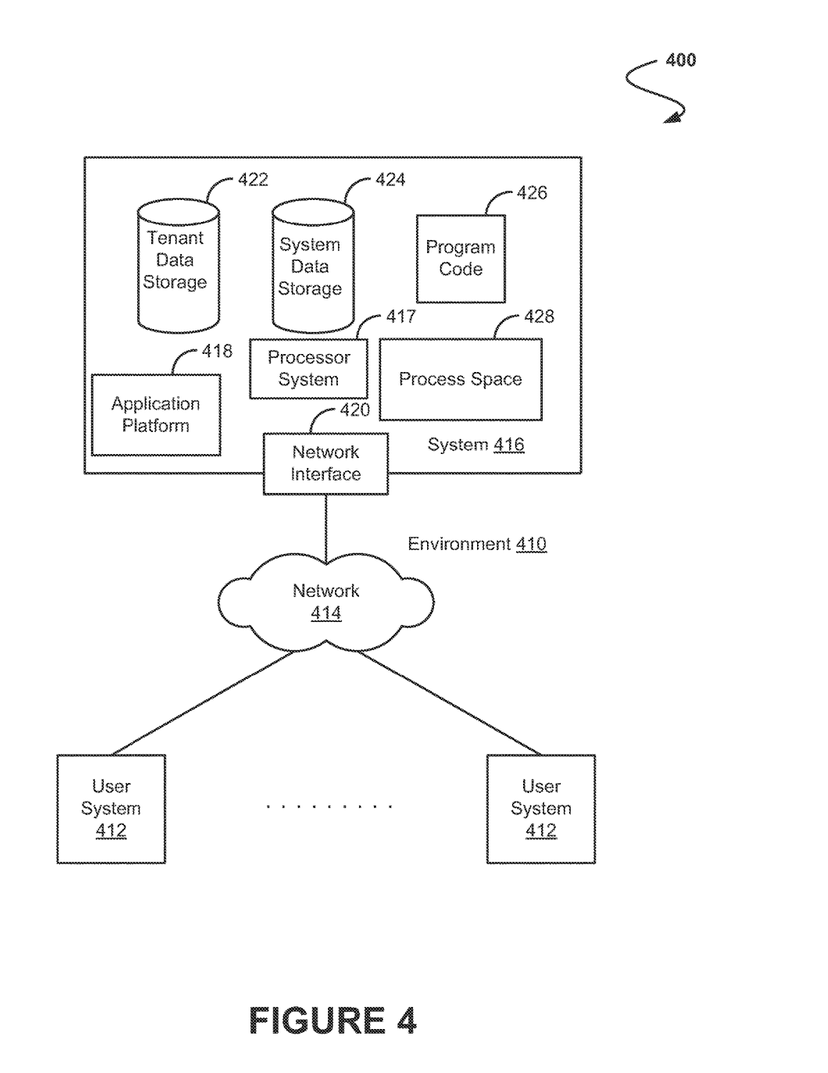
FIG. 4 illustrates a block diagram of an example of an environment wherein an on-demand database service might be used.

FIG. 4 illustrates a block diagram of an environment 410 wherein an on-demand database service might be used. As an option, any of the previously described embodiments of the foregoing figures may or may not be implemented in the context of the environment 410. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower, permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

Figure 5:
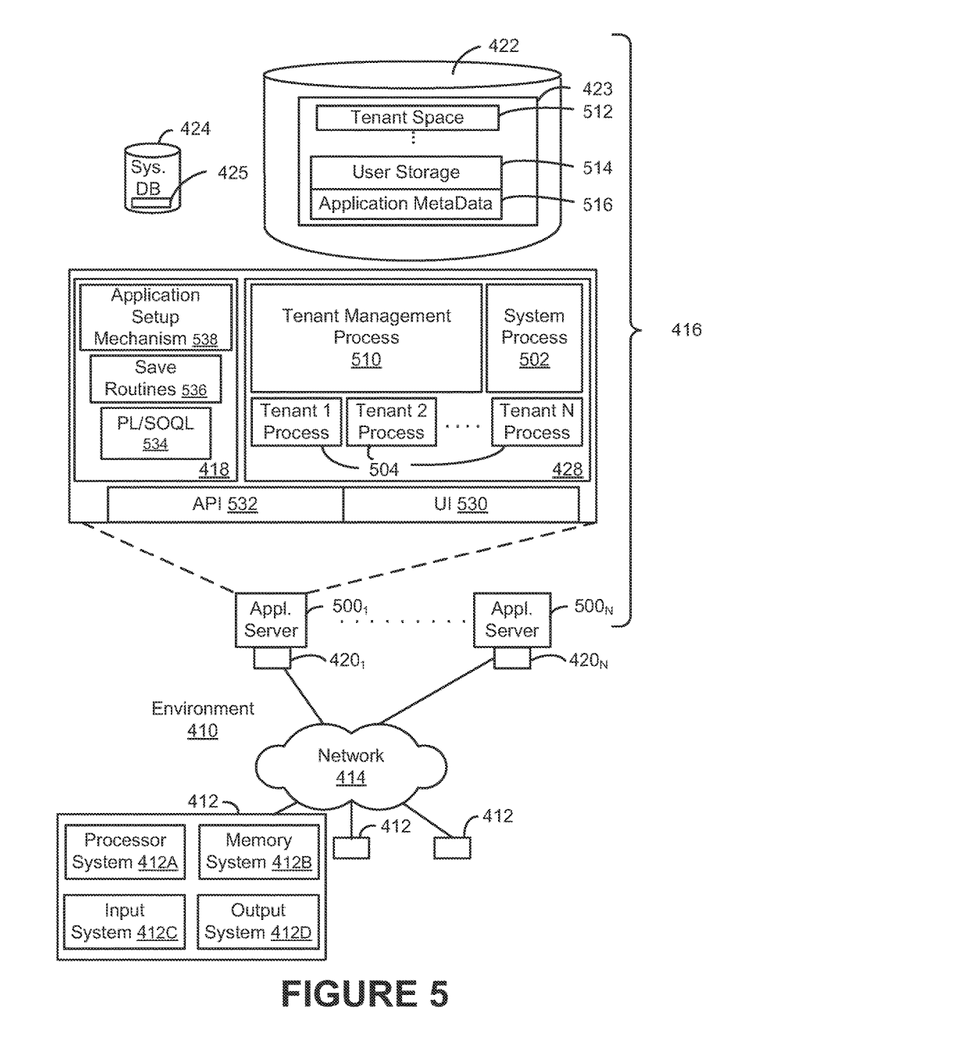
FIG. 5 illustrates a block diagram of an embodiment of elements of FIG. 4 and various possible interconnections between these elements.

One arrangement for elements of system 416 is shown in FIG. 5, including a network interface 420, application platform 418, tenant data storage 422 for tenant data 423, system data storage 424 for system data accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g. subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g. a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417 of FIG. 4, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g. in a server farm located in a single building or campus), or they may be distributed at locations remote from one another (e.g. one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL, 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL, 534 that provides a programming language style interface extension to API 532. A detailed description of some PL/SOQL language embodiments is discussed in commonly owned U.S. Provisional Patent Application 60/828,192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; US2006/0206834, titled "SYSTEMS AND METHODS FOR IMPLEMENTING MULTI-APPLICATION TABS AND TAB SETS," filed Mar. 8, 2005; and/or US2008/0010243, titled "METHOD AND SYSTEM FOR PUSHING DATA TO A PLURALITY OF DEVICES IN AN ON-DEMAND SERVICE ENVIRONMENT," filed Jun. 1, 2007; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A non-transitory computer readable medium having computer instructions stored therein that are adapted to be executed by a computer system to cause the computer system to perform operations comprising:

storing content in a multi-tenant database for each of a plurality of tenants, the content of each tenant being stored in a corresponding logically separated storage area for that tenant, wherein the plurality of tenants includes a particular tenant associated with a plurality of users;

maintaining, for a first user of the plurality of users associated with the particular tenant, an indication that the first user has subscribed to a particular tag such that the first user is to be alerted when at least a portion of the stored content is associated with the particular tag;

receiving, from a second user of the plurality of users associated with the particular tenant, tag information to be associated with a specified portion of the content stored for the particular tenant in the multi-tenant database, wherein the tag information specifies the particular tag;

after determining that the second user has permission to edit tags, modifying the received tag information according to a standard to create standardized tag information;

after the modifying, associating the standardized tag information with the specified portion of the content for the particular tenant of the multi-tenant database, such that ones of the plurality of users are allowed to view the standardized tag information applied to the specified portion of the content of the particular tenant, wherein associating the standardized tag information with the specified portion includes utilizing a separate data object to store a first reference value for looking up the standardized tag information and a second reference value for looking up the specified portion of the content, and wherein the viewed standardized tag information is selectable by ones of the plurality of users to view other content portions of the particular tenant that are also associated with that tag information;

based on determining that a number of tags applied to portions of the stored content for the particular tenant satisfies a threshold value, preventing ones of the plurality of users from causing additional tags to be applied to the stored content; and based on the indication that the first user has subscribed to the particular tag, alerting the first user about the specified portion in response to the specified portion being associated with the particular tag.

2. The non-transitory computer readable medium of claim 1, wherein the standardized tag information includes a standardized tag name.

3. The non-transitory computer readable medium of claim 1, wherein the content for the particular tenant includes a subset of records stored by the multi-tenant database.

4. The non-transitory computer readable medium of claim 1, wherein a number of tags are limited for each of the plurality of users associated with the particular tenant.

5. An apparatus, comprising:

a processor; and a non-transitory computer readable medium having stored thereon instructions which, when executed by the processor, cause the processor to perform operations comprising:

storing content in a multi-tenant database for each of a plurality of tenants, the content of each tenant being stored in a corresponding logically separated storage area for that tenant, wherein the plurality of tenants includes a particular tenant associated with a plurality of users;

maintaining, for a first user of the plurality of users associated with the particular tenant, an indication that the first user has subscribed to a particular tag such that the first user is to be alerted when at least a portion of the stored content is associated with the particular tag;

receiving, from a second user of the plurality of users associated with the particular tenant, tag information to be associated with a specified portion of the content stored for the particular tenant in the multi-tenant database, wherein the tag information specifies the particular tag;

modifying the received tag information according to a standard to create standardized tag information;

after the modifying, associating the standardized tag information with the specified portion of the content for the particular tenant of the multi-tenant database, such that ones of the plurality of users are allowed to view the standardized tag information applied to the specified portion of the content of the particular tenant, wherein associating the standardized tag information with the specified portion includes utilizing a separate data object to store a key value usable to look up the standardized tag information and another key value usable to look up the specified portion of the content, and wherein the viewed standardized tag information is selectable by ones of the plurality of users to view other content portions of the particular tenant that are also associated with that tag information;

based on determining that a number of tags applied to portions of the stored content for the particular tenant satisfies a threshold value, preventing ones of the plurality of users from causing additional tags to be applied to the stored content; and based on the indication that the first user has subscribed to the particular tag, alerting the first user about the specified portion in response to the specified portion being associated with the particular tag.

6. A method, comprising:

storing content in a multi-tenant database for each of a plurality of tenants, the content of each tenant being stored in a corresponding logically separated storage area for that tenant, wherein the plurality of tenants includes a particular tenant associated with a plurality of users;

maintaining, for a first user of the plurality of users associated with the particular tenant, an indication that the first user has subscribed to a particular tag such that the first user is to be alerted when at least a portion of the stored content is associated with the particular tag;

receiving, from a second user of the plurality of users associated with the particular tenant, tag information to be associated with a specified portion of the content stored for the particular tenant in the multi-tenant database, wherein the tag information specifies the particular tag;

modifying the received tag information according to a standard to create standardized tag information;

after the modifying, associating the standardized tag information with the specified portion of the content for the particular tenant of the multi-tenant database, such that ones of the plurality of users are allowed to view the standardized tag information applied to the specified portion of the content of the particular tenant, wherein associating the standardized tag information with the specified portion includes utilizing a separate data object having a tag field storing a reference to the standardized tag information and a content field storing a reference to the specified portion of the content, and wherein the viewed standardized tag information is selectable by ones of the plurality of users to view other content portions of the particular tenant that are also associated with that tag information;

based on determining that a number of tags applied to portions of the stored content for the particular tenant satisfies a threshold value, preventing ones of the plurality of users from causing additional tags to be applied to the stored content; and based on the indication that the first user has subscribed to the particular tag, alerting the first user about the specified portion in response to the specified portion being associated with the particular tag.

7. The non-transitory computer readable medium of claim 1, wherein a tag application programming interface (API) allows the plurality of users to access tags.

8. The non-transitory computer readable medium of claim 1, wherein the operations further comprise disallowing conflicting tag information that describes one or more data characteristics of the specified portion of the content from being applied to the specified portion of the content.

9. The non-transitory computer readable medium of claim 1, wherein the operations further comprise determining whether the first user has tag modification permissions for the specified portion of the content prior to allowing the first user to modify a standardized tag name included in the standardized tag information.

10. The apparatus of claim 5, wherein the operations further comprise determining whether the second user has tag modification permissions for the specified portion of the content prior to allowing the second user to modify a standardized tag name included in the standardized tag information.

11. The apparatus of claim 5, wherein the particular tenant has a limited number of tags available for use within the multi-tenant database.

12. The method of claim 6, further comprising:
receiving, at a tag data input interface, tag merge information for merging tags, wherein the tag merge information indicates a modification of a first tag name to a second tag name; and
in response to receiving the tag merge information, associating records of the first tag name with the second tag name.

13. The method of claim 12, wherein merging tags is based on permission information for the second user.

14. The method of claim 6, wherein the particular tenant has a limited number of tags available for use within the multi-tenant database.

15. The method of claim 6, further comprising:
receiving, from a third user of the plurality of users associated with the particular tenant, a search query for information in the multi-tenant database corresponding to one or more tags specified by one or more search terms in the search query;
normalizing at least one of the one or more search terms;
performing a search that is based on the at least one normalized search term; and
returning information from the multi-tenant database responsive to the search.

16. The method of claim 6, wherein the standardized tag information indicates a number of records in the content corresponding to a standardized tag name.

\* \* \* \* \*